Oct. 3, 1950

J. N. SALER 2,524,273

PISTON CONSTRUCTION

Filed June 3, 1948

WITNESSES:

INVENTOR
JULES N. SALER
BY
ATTORNEY

Patented Oct. 3, 1950

2,524,273

UNITED STATES PATENT OFFICE 2,524,273

PISTON CONSTRUCTION

Jules N. Saler, Springfield, Mass., assignor to Westinghouse Electric Corporation, East Pittsburgh, Pa., a corporation of Pennsylvania Application June 3, 1948, Serial No. 30,819

5 Claims. (Cl. 309—16)

This invention relates to a refrigerant compressor and more especially to a joint between the piston and the connecting rod of a reciprocating compressor.

Pistons of one inch in diameter or less are generally not provided with piston rings and depend upon a tight fit with the cylinder to effect fluid-tightness. Such a tight fit, in turn, requires that the working parts of the reciprocating compressor are perfectly aligned so that the axes of the crank shaft, of the crank pin, and of the wrist pin are parallel and the axis of the cylinder is at right angles to the axis of the wrist pin. Such perfect alignment is difficult to maintain in mass production.

It is accordingly an object of the invention to provide a linkage between a piston and a connecting rod which makes the exact alignment of the various axes of the moving parts of the compressor unnecessary.

It is a further object of the invention to provide a joint between the connecting rod and a piston which joint is economical to make and easy to assemble.

These and other objects are effected by the invention as will be apparent from the following description and claims taken in connection with the accompanying drawings, forming a part of this application, in which:

Figure 1:
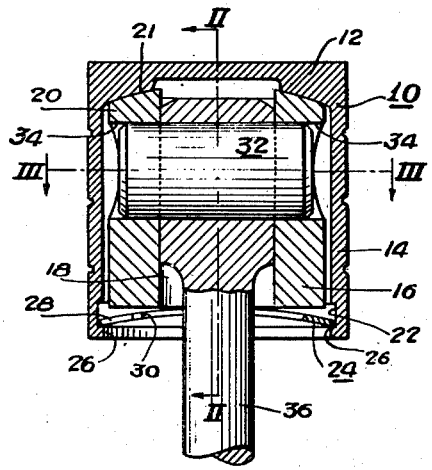
Fig. 1 is a sectional view of the joint between a piston and its connecting rod.

Referring to the drawings, the reference numeral 10 designates a piston having a head 12 and a skirt 14. A cylindrical member 16 having a generally rectangular interior opening 18 is positioned in the piston 10 and is spaced from the wall of the skirt 14. The upper edge 20 of the member is formed spherically and seats on a spherical socket 21 in the head 12 of the piston. A groove 22 is formed in the skirt 14 opposite the lower edge of the member 16, and a flexible split ring 24 cut from sheet metal is inserted in the groove 22 to retain the member 16 in position.

Figure 2:
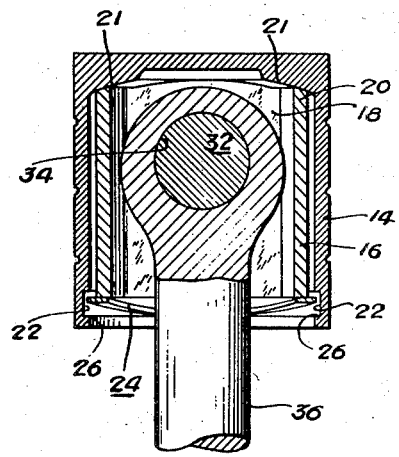
Fig. 2 is a sectional view on the line II—II of Fig. 1.
Figure 5:
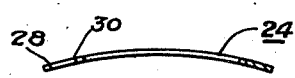
Fig. 5 is a sectional view on the line V—V of Fig. 4.
Figure 3:
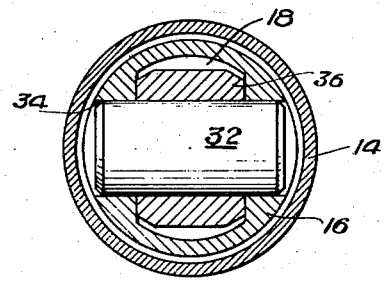
Fig. 3 is a sectional view on the line III—III of Fig. 1.
Figure 4:
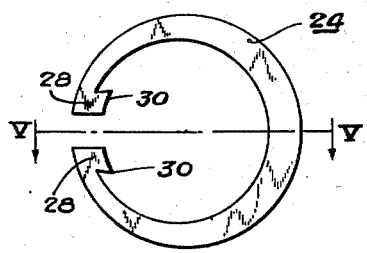
Fig. 4 is a plan view of the retaining ring.

The split ring is preferably arched, as best shown in Figs. 1, 2 and 5 and seats on the lower shoulder 26 of the groove 22 at three points, two of these points being the cut ends 28 of the split ring 24 and the third point being diametrically opposite from the cut ends 28 of the split ring 24. The split ring 24 engages the member 16 at two points each of which is approximately midway between the cut ends 28 of the ring 24 and the point on the ring diametrically opposite to the cut ends 28. The ring 24 consists of tempered spring steel and biases the member 16 against the spherical socket 21 in the piston head 12. The ring 24 is cut to provide two prongs 30 adjacent the cut ends 28. These prongs 30 assist in inserting the ring into the groove 22. This operation is effected with the aid of grippers which press the two prongs 30 together so that the ring 24 may be inserted into the groove 22.

A piston pin 32 is fitted into a transverse bore 34 in the member 16 and is engaged by the upper end of a connecting rod 36 which actuates the piston 10.

The piston shown in the drawings is for use in the compressor of a domestic refrigerator and more especially for a hermetically sealed motor-compressor unit, such as shown in Patent No. 2,283,024 issued on May 12, 1942, to E. R. Wolfert. In such a unit, the gas pressure on the upper and the lower surface of the piston is substantially equal during the suction stroke so that but little strain is placed on the split ring 24 during this stroke. For other compressors, a heavier split ring may be required. A coiled spring may also be interposed between a flat split ring and the member 16.

The ring 24 does not require anchoring to the member 16 or to the skirt 14 and may revolve in the groove 22. If any shifting of the member 16 takes place due to misalignment, the shifting will normally be in the plane on which the section shown in Fig. 1 is taken.

If the split ring 24 is in the position shown in Fig. 1, the member 16, on shifting, will slide slightly on the upper arch of the ring 24, and the latter will maintain its equalized pressure on opposite sides of the member 16. If the split ring 24 is in a position rotated in the groove 22 through an angle of 90° from the position shown in Fig. 1, the member 16, on shifting, will slide slightly on the upper contact points of the ring 24 and will also rock the ring 24 slightly on its lower contact points, so that the ring 24 still maintains its equalized pressure on opposite sides of the member 16. If the split ring 24 is in any other position, a combination of the two above described actions takes place when the member 16 shifts, and the ring 24 will still press equally on opposite sides of the member 16.

It will be apparent from the above that this invention provides a joint between a piston and its connecting rod which joint adjusts itself for slight misalignments in the actuating mechanism. It will likewise be apparent that this joint is simple to construct and easy to assemble.

While the invention has been shown in but one form, it will be obvious to those skilled in the art that it is not so limited, but is susceptible of various changes and modifications without departing from the spirit thereof.

What I claim is:

1. In a piston having a head and a skirt, the combination of a member positioned within said piston, a spherical bearing surface between said member and said piston, said bearing surface limiting the movement of said member towards said piston head but allowing movement of said member away from said head, spring means engaging said piston and said member for biasing said member towards said piston head, a wrist pin movable with said member, and a connecting rod engaging said wrist pin.

2. The piston defined in the immediately preceding claim wherein said spring means comprises a non-flat split ring, one side of said ring engaging said member and the other side of said ring engaging an internal shoulder on said skirt.

3. A housing having an internal bore including an internal shoulder, a member located in said bore and to one side of said internal shoulder, said member being dimensioned to slip into said bore past said shoulder, said member and said internal shoulder each having a substantially flat surface, said two surfaces being substantially parallel and spaced from one another and a split resilient retaining ring positioned to engage both of said flat surfaces, the plane of said ring being so warped that it touches one of said surfaces at substantially diametrically opposite points of the ring and the other of said surfaces also at two substantially diametrically opposite points of said ring, each of said last-named points being located substantially halfway along the rim of the retainer ring between the first-named two diametrically opposite points.

4. The combination defined in the immediately preceding claim wherein the split in said ring is located at one of the points of contact of the ring with one of said surfaces.

5. A housing having an internal bore including an internal shoulder, a member located in said bore and to one side of said internal shoulder, said member being diamensioned to slip into said bore past said shoulder, a split resilient retaining ring, the plane of said ring being warped to form substantially a portion of a cylinder, one side of said retaining ring engaging said internal shoulder and the other side of said retaining ring engaging said member.

JULES N. SALER.

REFERENCES CITED

The following references are of record in the file of this patent:

UNITED STATES PATENTS

| Number | Name | Date |
|---|---|---|
| 1,548,382 | Paul | Aug. 4, 1925 |
| 1,839,592 | Reynolds | Jan. 5, 1932 |
| 1,866,057 | Reid | July 5, 1932 |
| 1,996,826 | Ohmart | Apr. 9, 1935 |
| 2,107,795 | Larsh | Feb. 8, 1938 |
| 2,165,619 | Doeg | July 11, 1939 |
| 2,438,849 | Forster | Mar. 30, 1948 |

FOREIGN PATENTS

| Number | Country | Date |
|---|---|---|
| 372,910 | Great Britain | May 19, 1932 |